April 21, 1931. W. JENKS 1,801,506

APPARATUS FOR FILTERING AND TREATING AIR

Filed Jan. 7, 1929

Patented Apr. 21, 1931

1,801,506

UNITED STATES PATENT OFFICE

WALTER JENKS, OF LONDON, ENGLAND

APPARATUS FOR FILTERING AND TREATING AIR

Application filed January 7, 1929, Serial No. 330,943, and in Great Britain January 24, 1928.

This invention relates to apparatus for filtering and treating air. The general type of apparatus is known in which air to be filtered and treated enters at or near the bottom of a conduit across which lies a pervious filtering body which may also contain a receptacle for material, e. g. solids or liquid for disinfecting or deodorizing the air. This invention does not include within its scope any broad principles of construction or of method but the invention relates to certain details of arrangement and construction which tend towards silent and efficient working. It is found, for example, that if the motor and fan are mounted within the apparatus there is an undesirable noise, and moreover the motor is a serious obstruction to the flow of the air.

According to this invention apparatus for filtering and treating air comprises an air-conduit through which the air is sucked by a motor-driven-fan which motor and fan are arranged outside the said air-conduit, and means for securing the filtering and treating material in the inlet-opening of said air-conduit. Preferably the motor is situated outside the air steam which issues from the apparatus.

A feature of the invention consists in arranging the inlet-opening at or towards the lower end of the conduit and is flaring the conduit at the inlet end thereof; the filtering and treating material are preferably situated in the flared portion of the inlet-conduit whereby a low velocity air stream is caused to pass through the filtering medium.

A further feature of the invention consists in the employment of the centrifugal impeller for the motor-driven-fan having a central inlet port which is disposed face to face with and in close proximity to the outlet of said air-conduit.

Preferably the centrifugal impeller comprises top and bottom plates between which the blades of the impeller are secured, which plates are out of contact with said conduit whereby resonance of the conduit due to the transmission of vibration from the motor driven impeller to the conduit, is avoided.

A still further feature of the invention consists in the provision of a deflecting plate which is secured to the outlet end of said conduit and is arranged to extend upwardly and outwardly away from the lower edge of the impeller. With this arrangement the air thrown out by the impeller is deflected upwardly and thus prevents the formation of down-draughts. Another function of the deflection plate is to prevent air from being sucked in between the outlet end of the conduit and the inlet of the centrifugal impeller.

A still further feature of the invention consists in supporting both filtering material and charcoal in the inlet of said conduit.

Other features of the invention are set forth in the following description of one form of apparatus for filtering and treating air according to this invention. Reference is made to the accompanying drawing in which—

Figure 1:
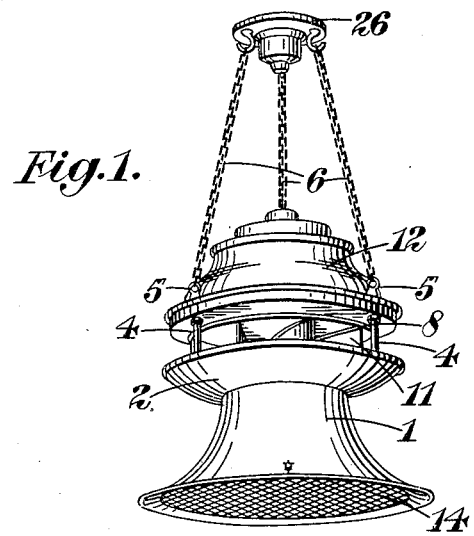
Figure 1 is a perspective view of the apparatus.
Figure 2:
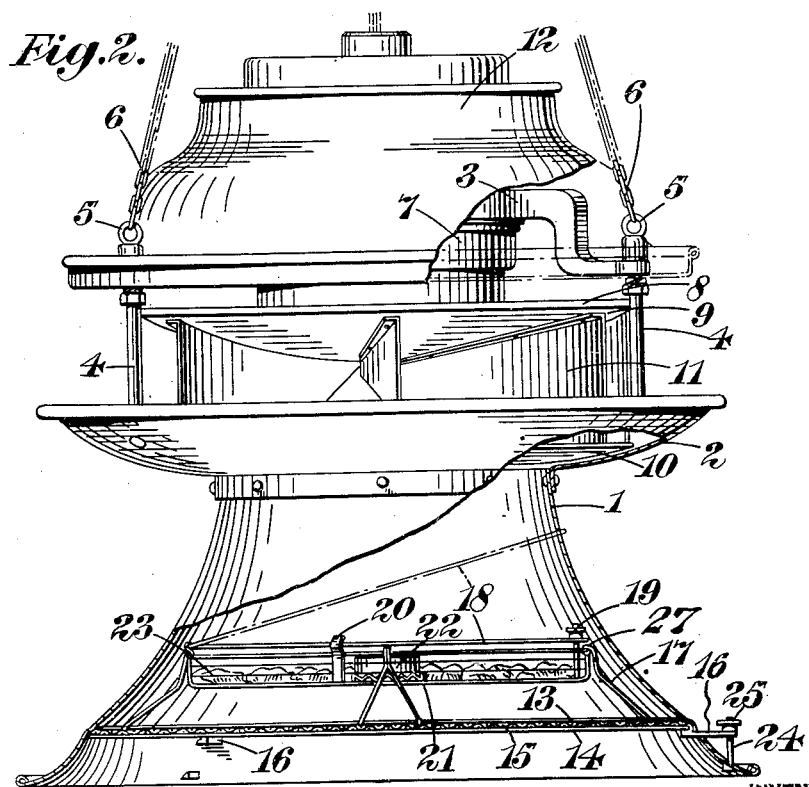
Figure 2 is a part elevation and part section of the apparatus.

The apparatus comprises an air-conduit 1 which is flared outwardly towards its lower extremity to form a substantially bell-shaped conduit and which has secured to its upper extremity a deflecting plate 2. The flared end of the conduit comprises the inlet-opening. The conduit and deflecting plate are suspended from a platform 3 by means of three bolts 4 which are welded to the said deflecting plate. The upper end of the bolts project through the said platform and are provided on the projecting ends with rings 5 to which are secured suspension chains 6. The platform 3 is in the form of a spider the centre portion of which is apertured to provide a seating for a motor 7. The motor shaft extends downwardly from said platform and has secured at its lower extremity an impeller 8. The impeller comprises upper and lower dished plates 9 and 10 respectively between which impeller blades 11 are secured. The lower plate 10 is provided with a central inlet port not shown in the drawings, which port is substantially the same size as the outlet port at the top of the air-conduit and registers with said outlet port. The deflecting plate 2 is dished and arranged to be in close proximity with the lower dished plate 10 of the impeller. The deflecting plate extends upwardly and outwardly beyond the lower edge of the impeller. A casing 12 is arranged around the motor above the platform to which it is secured by the bolts 4. A wire basket for holding the filtering material and air treating material is secured in the lower part of the air-conduit. The wire basket comprises two circular flat grids 13 and 14, one arranged over the other between which is located a disc of filtering material 15. The lower grid 14 is supported on three lugs 16 which are located in holes in the air-conduit. A wire container 27 is secured to and spaced away from the upper grid by means of legs 17. The container is provided with a hinged lid 18 which is held closed by a thumb-screw 19 and clips 20. A compartment 21 is centrally located within the container for holding a block of fumigating material 22 such as a perforated plug of porous clay which is saturated with fumigating oil or germicide. The remaining part of the container is packed closely with charcoal 23.

In assembling the wire basket in the air-conduit the lugs 16 are withdrawn radially inwards from the conduit and the basket is inserted in position. The lugs 16 are then inserted in holes in the conduit beneath the basket and are secured in position by means of bolts 24 which extend through slots in the lugs and are provided with securing nuts 25. In Figure 1 the apparatus is shown suspended from a rose 26 which is adapted to be secured to the ceiling of the room in which the apparatus is to be situated.

It will be appreciated that many modifications may be made to the constructional details of the apparatus without departing from the scope of this invention, for example, the air-inlet instead of being constituted by the open lower end of the conduit might be constituted by an annular opening in the conduit which would then be closed at the bottom.

I claim:—

1. In apparatus for filtering and treating air, the combination of an air conduit having an inlet and an outlet opening, a motor and a centrifugal impeller driven thereby both arranged adjacent to and outside the outlet end of said conduit for sucking air therethrough, and a deflecting plate secured to the outlet end of the conduit, which plate extends upwardly and outwardly away from the lower edge of said impeller for the purpose described.

2. Apparatus for filtering and treating air, comprising an air-conduit having inlet and outlet openings, a motor-driven-fan for sucking air through said conduit, which motor and fan are arranged outside and adjacent to the outlet of said conduit, and a wire basket supported in the inlet opening of said air conduit, which basket comprises two flat grids detachably secured together and adapted to hold between them a layer of filtering material and a wire container secured to and spaced away from one of said grids and adapted to hold the treating material.

3. Apparatus for filtering and treating air, comprising an air-conduit having inlet and outlet openings, a motor-driven-fan for sucking air through the conduit, which motor and fan are arranged outside the conduit, a wire basket for supporting both air-filtering and treating material arranged in the inlet opening of said air-conduit, a stiff rim on said basket, and removable lugs carried by the air-conduit for engaging said stiff rim and detachably connecting the said basket to the conduit.

4. Apparatus according to claim 3, wherein the said basket comprises two flat grids detachably secured together and adapted to hold between them a layer of filtering material and a wire container for holding the treating material, which container is secured to and spaced away from one of said grids and is provided with a detachable lid.

5. Apparatus for filtering and treating air, comprising a platform on which is supported a motor, a centrifugal impeller situated below said platform and driven by said motor, an air-conduit having a deflecting plate at its outlet end, which deflecting plate is secured by bolts on said platform and is situated in close proximity to the inlet opening of said impeller, which bolts extend to the upper face of said platform and are provided with means for suspending the complete apparatus from a location situated above the said apparatus.

6. A self-contained portable apparatus for filtering and treating air, comprising in combination an air-conduit having inlet and outlet openings, a centrifugal impeller for sucking air through the said conduit, a motor for driving said impeller, which motor and impeller are both arranged outside the conduit, which impeller comprises upper and lower plates out of contact with the air-conduit for the purpose described and impeller blades secured between said plates.

7. In apparatus for filtering and treating air, the combination of a substantially bell-shaped air-conduit the larger end of which constitutes the inlet to said conduit, a motor and a centrifugal impeller driven thereby both disposed outside but adjacent to the outlet end of said conduit for sucking air therethrough, and a dish-shaped deflecting plate secured to the outlet end of said conduit to direct the air upwardly and outwardly away from the lower edge of the said impeller.

8. A self-contained unitary apparatus for filtering and treating air, comprising in combination an air-conduit having an inlet opening at one end and an outlet opening at the other end, which conduit is flared towards said inlet opening, a fan disposed outside said air-conduit for sucking air therethrough, a motor for driving the fan arranged outside the air stream which issues from the conduit, a casing separate from the air-conduit around the motor, and means for securing air-filtering and treating material in the flared portion of the air-conduit.

9. Apparatus for filtering and treating air, comprising a platform on which is supported a motor, a centrifugal impeller arranged below said platform and driven by said motor, an air-conduit having inlet and outlet openings, a deflecting plate located at the outlet end of said air-conduit in close proximity to the inlet opening of said impeller, which deflecting plate extends upwardly and outwardly away from the lower edge of said impeller, bolts for securing said deflecting plate to said platform, which bolts extend to the upper face of said platform and are provided with means for suspending the complete apparatus from a location situated above the said apparatus, a wire basket for filtering material disposed in the inlet opening of said air-conduit, a wire container for the treating material carried by said basket, and means for detachably connecting said basket to the air conduit.

In testimony whereof I affix my signature.

WALTER JENKS.